March 10, 1970     D. L. SIMPKINS     3,499,283
ROCKET CHARGE DESIGN
Filed Dec. 23, 1965
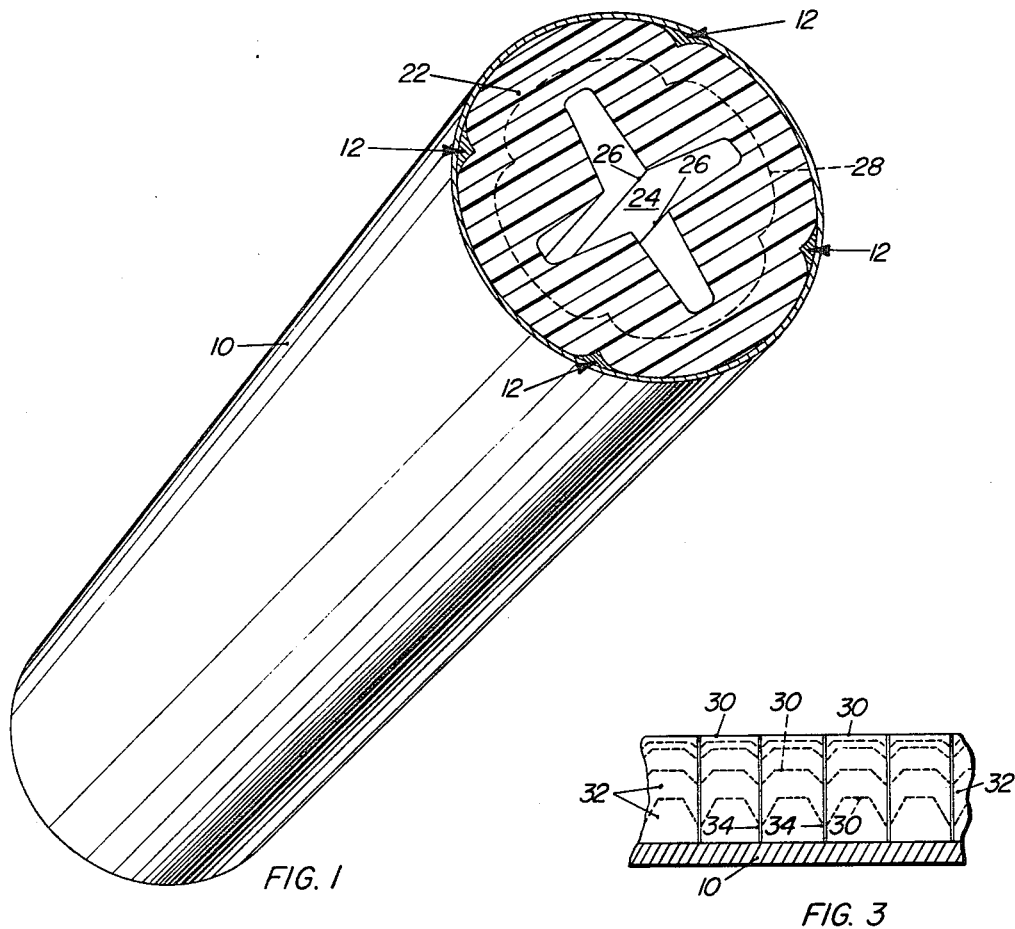
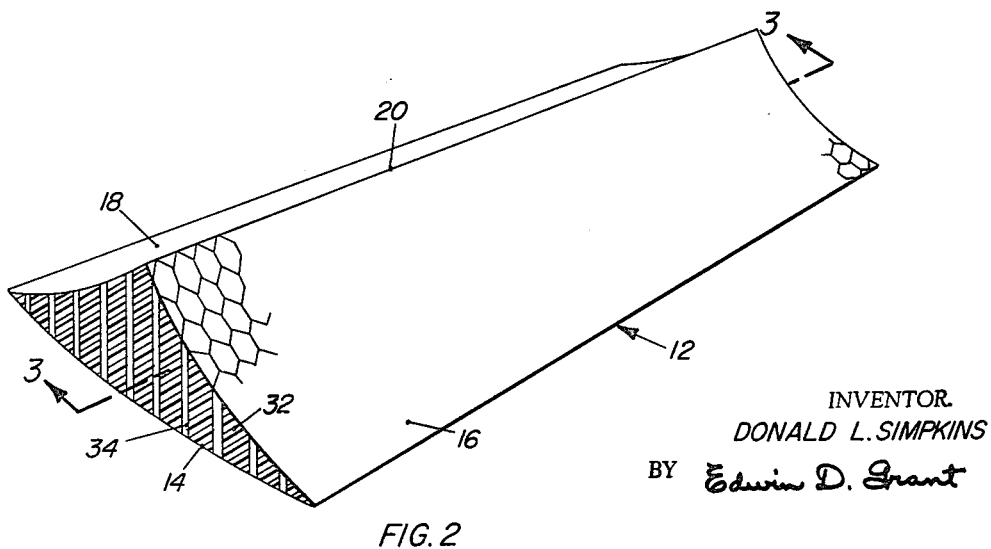
INVENTOR.
DONALD L. SIMPKINS
BY Edwin D. Grant
ATTORNEY United States Patent Office 3,499,283
Patented Mar. 10, 1970

3,499,283
ROCKET CHARGE DESIGN
Don L. Simpkins, Brigham City, Utah, assignor to Thiokol Chemical Corporation, Bristol, Pa., a corporation of Delaware
Filed Dec. 23, 1965, Ser. No. 516,067
Int. Cl. F02k 9/04
U.S. Cl. 60—39.47                  2 Claims

ABSTRACT OF THE DISCLOSURE

This invention relates to solid propellant rocket motors and more particularly to improved solid propellant rocket motors having means which provide relatively constant rates of combustion of the solid propellant in their terminal stages.

In the art of solid propellant rocketry, monopropellant charges having noncylindrical star-shaped internal cavities are commonly cast in cylindrical motor cases. Since such a charge burns at the surfaces of its internal cavity outwardly toward the motor case (more specifically, in a direction normal to all surfaces of the internal cavity of the charge), its flame front reaches some portions of the cylindrical case wall before others. This uneven "burnout" results in formations of propellant, present in a rocket motor at the end of its firing period, which are longitudinally oriented along the wall of the motor case and which, because of their general shape, are known in the art as "slivers." Obviously the surface of such slivers exposed to burning before the charge is completely consumed is considerably less than the surface of propellant exposed to burning prior to the time the flame front reaches the case wall, and also this sliver surface continuously decreases with time. Consequently, this reduces burning surface of the propellant at the end of the firing period of the rocket motor results in a period of thrust decay (i.e., a period of gradually diminishing thrust) instead of the abrupt "cutoff" thrust termination that is desirable from the standpoint of optimal performance of a rocket motor.

Heretofore strips of an inert material have been placed around the interior case walls of solid propellant rocket motors at points thereon where it has been found that the aforementioned slivers of propellant would normally form as a result of uneven burning of the charge in a radial direction. The cross-sections of such inert slivers have been designed so that the flame front of the burning charge reaches all portions of the cylindrical case wall at approximately the same time it reaches the surfaces of the slivers adjacent the propellant core, thus providing for abrupt termination of the thrust produced by the rocket motor. It will be obvious, however, that the weight of such inert slivers, which contributes nothing to thrust, adversely affects the payload which can be handled by a rocket motor of any given motor case size.

It is therefore a broad object of this invention to provide an improved solid propellant rocket motor having means which provide a relatively constant rate of combustion of the propellant of the motor at the end of its firing period without adversely affecting the usable weight thereof. In accordance with the principles of this invention, this object, as well as other objects hereinafter stated, is achieved by a preferred embodiment of the invention comprising: a cylindrical casing; a plurality of metallic, cellular slivers extending longitudinally of said casing and spaced circumferentially about the inner surface thereof; and a perforated solid propellant charge fixedly disposed within said casing, circumferentially spaced peripheral portions of said charge being disposed within the cells of said slivers.

Another object of this invention is to provide an improved solid propellant rocket motor which produces relatively constant thrust at the end of its firing period.

An additional object of this invention is to provide a solid propellant rocket motor the burning surface of which remains relatively constant at the end of the firing period of said motor.

The aforementioned and other objects of the invention are attained by means of a preferred embodiment of the invention that is described in the following specification and illustrated in the accompanying drawings, wherein:

FIGURE 1 is a pictorial view illustrating a section of the perferred embodiment of the invention;

FIGURE 2 is a pictorial view of a typical one of a plurality of slivers utilized as components of the embodiment of the invention illustrated in FIGURE 1; and FIGURE 3 is a fragmentary longitudinal sectional view of a typical one of said slivers, taken along the plane represented by line 3—3 of FIGURE 2.

Throughout the specification and drawings, the same reference numbers designate the same parts.

As illustrated in FIGURE 1, a rocket motor constituting a preferred embodiment of the invention comprises a hollow, cylindrical casing 10 which may be formed of any suitable metal. Four elongated slivers, each generally designated by reference number 12 and formed of aluminum honeycomb material, extend longitudinally of casing 10 and are spaced around the inner surface thereof. In FIGURE 2, which illustrates a typical one of the slivers 12, it can be seen that the cells of each of said slivers are hexagonal in cross-section and disposed substantially perpendicular to a first convex side 14 thereof, this side being bonded to the inner surface of casing 10 by means of a suitable adhesive. Thus the cells of the slivers extend radially of casing 10. Each sliver 12 includes second and third concave sides 16, 18 which project inwardly from the inner surface of casing 10 and meet at a linear edge 20. Fixedly disposed within casing 10 is a centrally perforated solid propellant charge 22, the cavity 24 of which is coaxial with casing 10 and comprises four recesses each of which extends in a direction generally radial to the axis of said casing. As can be seen in FIGURE 1, the edge 20 of each sliver 12 is radially aligned with a respective one of the linear, longitudinally extending inner edges 26 of cavity 24 in charge 22. Thus the slivers are arranged to form the pattern of slivers that would normally be formed in a rocket motor having a charge with a central cavity of the design illustrated in FIGURE 1. Each sliver 12 is coextensive with charge 22.

In the preferred embodiment of the invention herein described, the same propellant used in charge 22 is cast within the cells of slivers 12 before the latter are bonded to casing 10, and thereafter the main portion of the charge is cast within said casing and the cavity 24 formed therein by techniques which are well-known to persons skilled in the art. However, it will be obvious that slivers 12 can be bonded to casing 10 and thereafter filled with propellant at the time charge 22 is cast within casing 10. Although for the sake of simplicity no liner material is illustrated in the drawings, it will also be obvious that many conventional liner materials can be applied to the inner surface of casing 10 to provide a strong bond between the periphery of charge 22 and said casing. Charge 22 (which is to be understood as including the solid propellant disposed within the cells of slivers 12) can be formed of many different combustible materials employed in solid propellant rocket motors. Furthermore, in some instances it may be advantageous to fill the cells of slivers 12 with a propellant material of different composition from that used for the portion of charge 22 that is not within said cells.

As mentioned hereinbefore, burning of a combustible rocket motor charge having an internal cavity of star-shaped configuration occurs in such a manner that the flame front reaches the wall of the motor casing at certain points thereon before it reaches others. This phenomenon of the burning of such a combustible charge will readily be appreciated by inspection of FIGURE 1 wherein the broken line 28 represents the contours of the internal cavity of charge 22 as they appear near the end of the firing period of the rocket motor. Since the sides 16, 18 of slivers 12 project in a gradual curve toward the center of charge 22, the flame front reaches said slivers at substantially the same time it reaches the wall of casing 10. Thereafter burning occurs at the inwardly facing, longitudinally extending surfaces 30 (see FIGURE 3) of the separate portions 32 of charge 22 disposed within the cells of slivers 12. However, heat flow along the walls 34 of slivers 12 in the direction of casing 10 causes the propellant adjacent said walls to burn more rapidly than the propellant that is remote therefrom. Consequently, as illustrated in FIGURE 3, inwardly projecting peaks are formed within the cells of slivers 12 as the burning surfaces 30 move toward casing 10, with the result that the total area of burning surface of portions 32 of charge 22 increases rapidly near the end of the firing period of the disclosed rocket motor and there is not a gradual decline in thrust such as occurs when the solid propellant slivers formed in conventional rocket motors are consumed after the flame front has reached the casing wall between said slivers. Hence the invention provides a rocket motor having relatively constant thrust near the end of its firing period.

It will be recognized that modifications can be made to the components of the disclosed rocket motor without departing from the principles of the invention, said rocket motor being presented for the purpose of example only and not being intended to limit the scope of the invention to the specific details thereof. For example, the cavity 24 of charge 22 can have a different start configuration, in which case the number of slivers 12 will be the same as the number of radially extending recesses of the particular star configuration that is utilized, these slivers being spaced circumferentially of casing 10 so that a sliver is evenly spaced between each adjacent pair of said recesses. Obviously slivers 12 can be formed of different heat-conductive, cellular materials, the main requisite of any material used to form the slivers being that it is capable of conducting heat into the portions 32 of charge 22 contained within the cells of said slivers at such a rate that burning of said portions 32 occurs more rapidly adjacent the walls 34 thereof. In some instances, it may be advantageous to orient the cells of slivers 12 so that they extend substantially perpendicular from the sides 16, 18 of said slivers, in which arrangement the cells obviously will not be disposed radial to casing 10 as illustrated in FIGURE 2 but will be disposed at some oblique angle to said casing. Therefore, in the claims appended hereto the cells of slivers 12 are defined as extending "inwardly from said casing," which definition is to be understood as encompassing a radial orientation of the cells of slivers 12 as well as an orientation of the cells wherein they are disposed generally perpendicular to the advancing flame front of charge 22 (i.e., perpendicular to the sides 16, 18 of slivers 12 or at some other slightly oblique angle relative thereto that will provide optimal burning characteristics of said slivers). Although in the preferred embodiment, the portion of the charge that is within the cells of the slivers 12 extends to the inner surface of casing 10, in some applications of the invention the charge may advantageously extend to a point within the cells that is spaced from the inner surface of casing 10.

Since many such modifications of the invention are possible, its scope is to be limited only by the terms of the appended claims.

What is claimed is:

1. In a rocket motor having a tubular casing, the combination comprising a plurality of slivers extending longitudinally of said casing and spaced about the inner surface thereof, said slivers being formed of a heat-conductive, cellular material the cells of which extend inwardly from said casing, and a centrally perforated solid propellant charge fixedly disposed within said casing, said charge extending into the cells of said slivers and contacting the inner surfaces thereof.

2. The combination of claim 1 wherein said slivers are formed of a metallic honeycomb material.

References Cited

UNITED STATES PATENTS 3,253,405    5/1966    Kropa _____ 60—253
3,296,794    1/1967    Nash _____ 60—39.47

CARLTON R. CROYLE, Primary Examiner

U.S. Cl. X.R.

60—253